(12) United States Patent
Kondo et al.

(10) Patent No.: US 7,237,779 B2
(45) Date of Patent: Jul. 3, 2007

(54) VEHICLE HEIGHT ADJUSTING APPARATUS

(75) Inventors: Kazuo Kondo, Kanagawa (JP); Yoshihiro Kawabe, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 526 days.

(21) Appl. No.: 10/776,351

(22) Filed: Feb. 12, 2004

(65) Prior Publication Data

US 2004/0217561 A1 Nov. 4, 2004

(30) Foreign Application Priority Data

Feb. 18, 2003 (JP) .............................. 2003-039165
Dec. 11, 2003 (JP) .............................. 2003-413478

(51) Int. Cl.
*B60G 17/00* (2006.01)

(52) U.S. Cl. .................................................. 280/6.157
(58) Field of Classification Search ............. 280/6.157, 280/6.159, 6.16, 124.103, 124.106
See application file for complete search history.

(56) References Cited

U.S. PATENT DOCUMENTS 2,698,758 A 1/1955 Ronning
3,218,088 A * 11/1965 Nallinger et al. ........ 280/6.152
5,306,038 A * 4/1994 Henderson, Jr. ............ 446/466
5,700,026 A 12/1997 Zalewski et al.

FOREIGN PATENT DOCUMENTS

| DE | 37 13 053 A1 | 11/1988 |
| DE | 40 01 601 A1 | 7/1991 |
| JP | 3294672 B2 | 4/2002 |

* cited by examiner

*Primary Examiner*—Faye M. Fleming
(74) *Attorney, Agent, or Firm*—Foley & Lardner LLP

(57) ABSTRACT

A vehicle height adjusting apparatus includes a suspension spring supporting a sprung weight of a vehicle, a pivotal unsprung member carrying a road wheel and connected to a lower end of the suspension spring so as to pivot in response to deformation of the suspension spring, and a drive mechanism adapted so as to be free from the sprung weight and capable of moving the unsprung member so as to cause the suspension spring to increase or decrease in length and thereby adjusting a vehicle height at the road wheel.

24 Claims, 6 Drawing Sheets

VEHICLE HEIGHT ADJUSTING APPARATUS

BACKGROUND OF THE INVENTION

The present invention relates to a vehicle height adjusting apparatus.

Heretofore known is a vehicle height adjusting apparatus that includes a screw drive mechanism by way of which a piston rod of a damper disposed between a vehicle body side and a carrier side is connected to the vehicle body side or the carrier side so that the piston rod is movable upward and downward as disclosed in Japanese Patent No. 3294672. The screw drive mechanism of the vehicle height adjusting apparatus includes a ball screw and a nut threadedly engaged with each other by way of balls. The ball screw is rotatably connected to a vehicle body side member of the damper or an carrier side member. The nut is connected to the piston rod or the cylinder, and either of the ball screw or the nut is connected to a drive unit. When the ball screw or nut is driven by the drive unit, the relative position of the ball screw and nut is changed, thereby adjusting the vehicle height.

SUMMARY OF THE INVENTION

However, the screw drive mechanism of the vehicle height adjusting apparatus performs adjustment of the vehicle height while supporting all the weight of the vehicle body (sprung weight), so that the members constituting the screw drive mechanism need to have a sufficient strength. Further, in order to move the unsprung members upward and downward of the vehicle, the screw drive mechanism must be rotated while supporting all the sprung weight, resulting in the necessity of a large output of the drive unit.

It is accordingly an object of the present invention to provide a vehicle height adjusting apparatus that can decrease the necessary strength of the members constituting the apparatus and the necessary output of the drive unit.

To achieve the above object, there is provided according to an aspect of the present invention a vehicle height adjusting apparatus comprising a suspension spring supporting a sprung weight of a vehicle, a pivotal unsprung member carrying a road wheel and connected to a lower end of the suspension spring so as to pivot in response to deformation of the suspension spring, and a drive mechanism adapted so as to be free from the sprung weight and capable of moving the unsprung member so as to cause the suspension spring to increase or decrease in length and thereby adjusting a vehicle height at the road wheel.

According to another aspect of the present invention, there is provided a vehicle suspension system comprising a suspension member pivotally connected at an end portion thereof to a vehicle body side member and rotatably supporting a road wheel, a suspension spring disposed between the vehicle body side member and the suspension member, a line member connected at one end thereof to the suspension member, and a drive unit installed on the vehicle body side member and connected to the other end of the line member, the drive unit being capable of driving the line member toward and away from the vehicle body side member and thereby adjusting a vehicle height at the road wheel.

DESCRIPTION OF THE PREFERRED EMBODIMENTS

Figure 1:
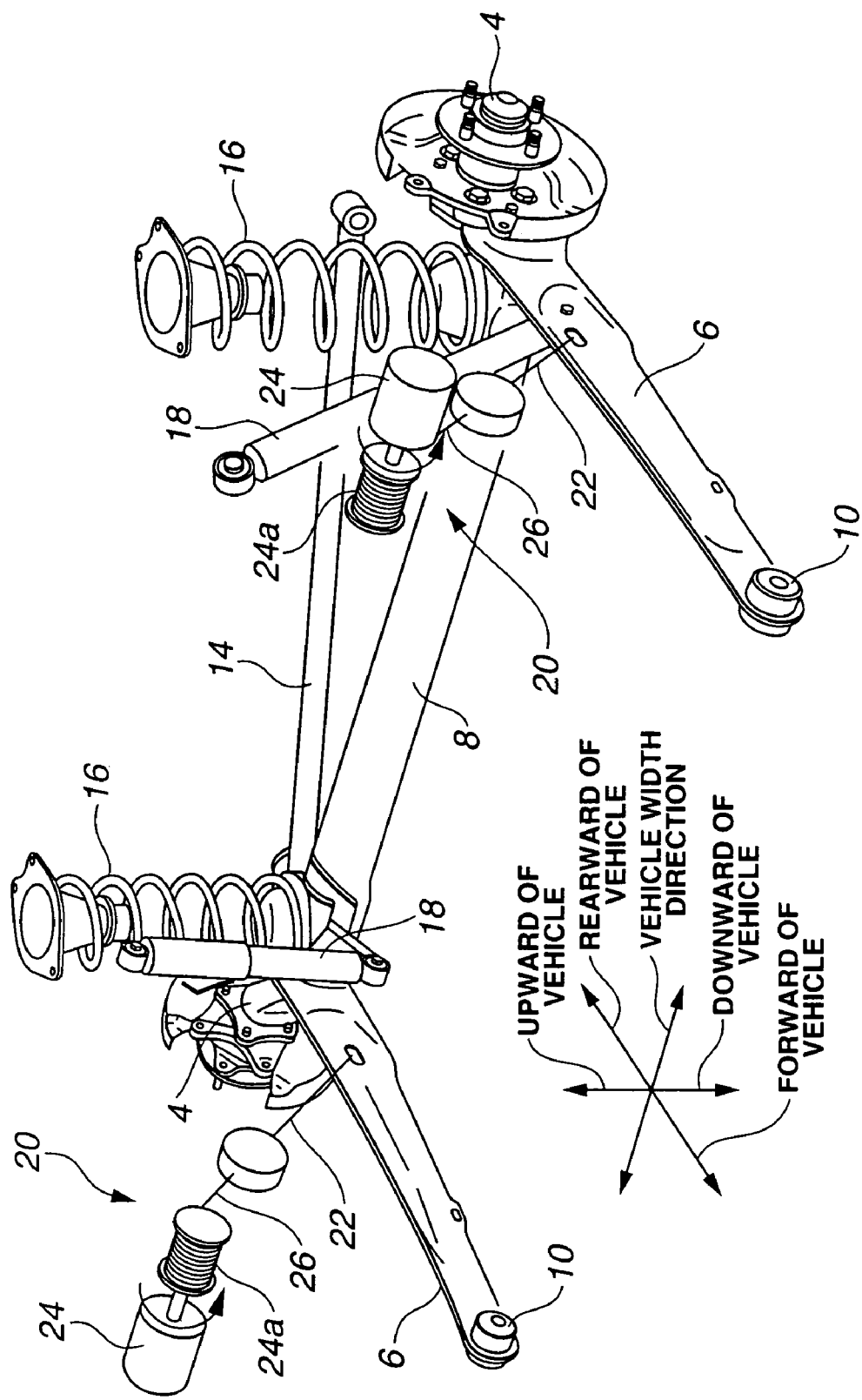
FIG. 1 is a perspective view of a torsion beam type suspension system having a vehicle height adjusting apparatus according to a first embodiment of the present invention.
Figure 2:
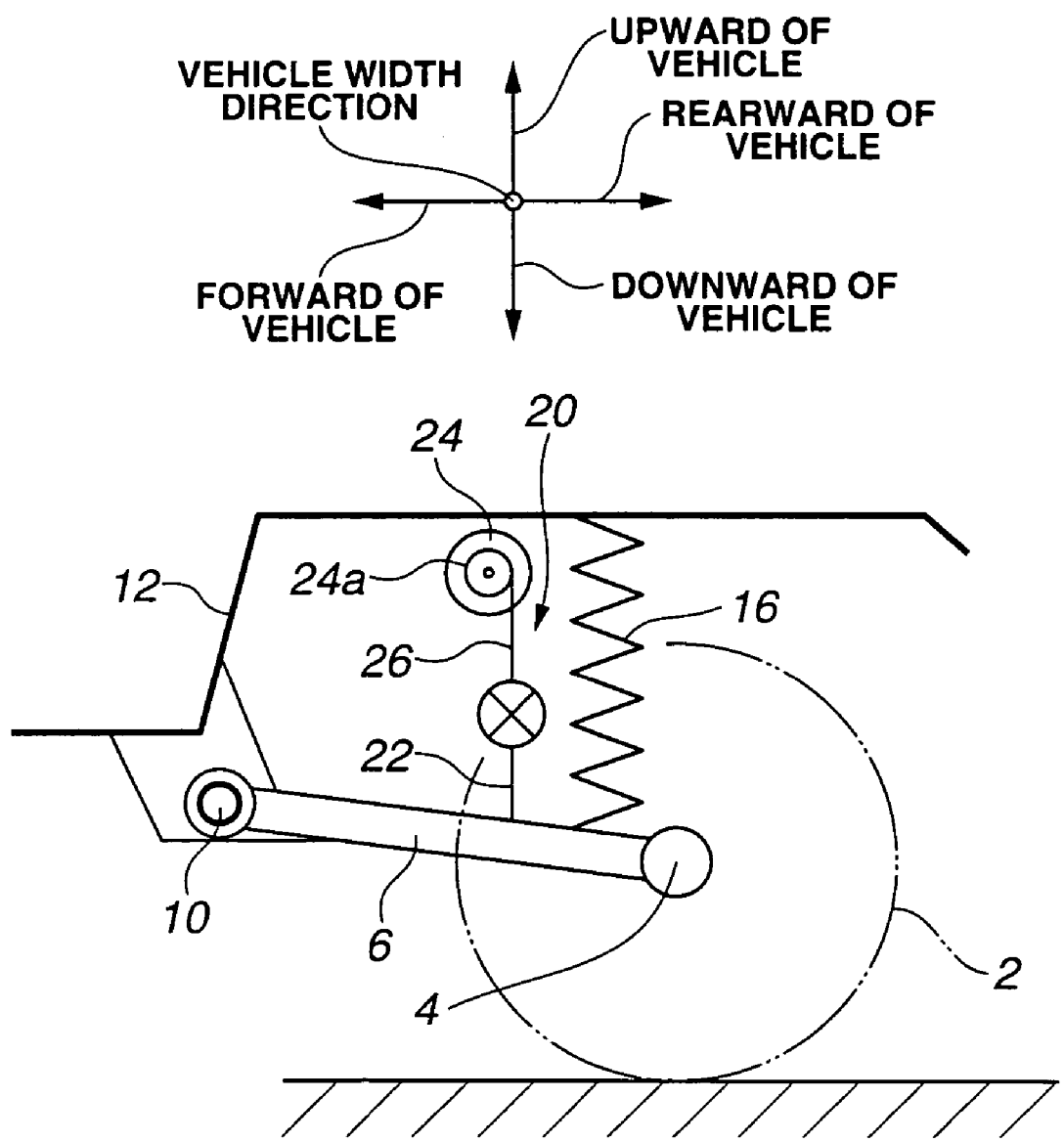
FIG. 2 is a schematic view of the vehicle height adjusting apparatus of FIG. 1 when taken in the vehicle width direction.

Referring first to FIGS. 1 and 2, a torsion beam type suspension system having a vehicle height adjusting apparatus according to a first embodiment of the present invention is shown.

The suspension system has a pair of hub carriers 4 rotatably supporting or carrying left and right road wheels 2, respectively and a pair of left and right trailing arms (pivotal unsprung members) 6 elongating in the front-to-rear direction of a vehicle. Carriers 4 are secured to rear end portions of trailing arms 6, respectively. The rear end portions of trailing arms 6 are secured to torsion beam 8 elongating in the vehicle width direction so as to constitute an integral unit. Front end portions of trailing arms 6 are connected to vehicle body side member 12 by way of resilient bushings 10, respectively.

Lateral link 14 is pivotally attached at opposite axial ends thereof to an axial end of torsion beam 8 and vehicle body side member 12 by way of resilient bushings (not shown) so as to incline upward as it extends in the vehicle width direction from the torsion beam 8 to vehicle body side member 12.

Between the joint at which each trailing arm 6 and torsion beam 8 are joined and vehicle body side member 12 is disposed coil spring (suspension spring) 16 that supports the weight of a vehicle body (sprung weight). Further, shock absorbers 18 are pivotally connected at lower ends thereof to left and right carriers 4 and at upper ends thereof to vehicle body side member 12.

In this embodiment, a pair of drive mechanisms 20 are disposed on the opposite sides of the vehicle body that are opposed in the vehicle width direction, for moving trailing arms 6 upward and downward of the vehicle.

Each drive mechanism 20 includes wire (line member) 22 having a lower end connected to a rearward side of trailing arm 6, reversible motor (drive source) 24 installed on vehicle body side member 12 at a location above the place where wire 22 is connected to trailing arm 6, reel 24a secured to a rotation shaft of motor 24, and spiral spring (resilient member) 26 wound around reel 24a and having an end connected to an upper end of wire 22. Reversible motor 24 and reel 24a constitute a drive unit for driving wire 22 toward and away from vehicle body side member 12.

In this connection, the spring constant of spiral spring 26 is set at a value smaller than that of coil spring 16.

In case the vehicle height is to be decreased, each reel 24a is driven by motor 24 of drive mechanism 20 so as to rotate a predetermined number of turns in the direction indicated by the arrow in FIG. 1. The predetermined number of turns of reel 24a causes spiral spring 26 to be wound around reel 24a while being resiliently deformed and thereby causes wire 22 to be pulled. By this, coil spring 16 is compressed and becomes shorter in length, thus causing the vehicle body to move downward and therefore the vehicle height to decrease.

In case the vehicle height is to be increased, each reel 24a is driven by motor 24 of drive mechanism 20 so as to rotate a predetermined number of turns in the direction opposite to that indicated by the arrow in FIG. 1. The predetermined number of turns of reel 24a causes spiral spring 26 wound around reel 24a to be unwound or paid out. This allows coil spring 16 to become longer in length, thus causing the vehicle body to move upward and therefore the vehicle height to increase.

In this connection, in case the vehicle height is to be adjusted by 100 mm under the condition in which the weight of the vehicle body is 1500 Kg, the spring constant of coil spring 16 is 19.6 N/mm and the spring constant of spiral spring 26 is 1.96 N/mm, the driving force F1 of motor 24 and the amount of deformation H of spiral spring 26 required for such adjustment are the following values, respectively.

$$F1=(19.6-1.9)\times 100=1764 \text{ N} \quad (1)$$

$$H=100\times(19.6-1.96)/1.96=900 \text{ mm} \quad (2)$$

In contrast to this, in case the same vehicle height adjustment is to be made by means of the conventional vehicle height adjusting apparatus having the above-described screw drive mechanism that supports the weight of the vehicle body, the driving means is required to produce the following driving force F2.

$$F2=1500\times 9.8/4=3675 \text{ N} \quad (3)$$

From the equations (1) and (3), the ratio of the driving force F1 of motor 24 to the driving force F2 of the conventional driving means is F1/F2=0.48, so that the driving force F1 of motor 24 in this embodiment can be smaller as compared with that F2 of the conventional vehicle height adjusting apparatus.

Accordingly, in this embodiment, the output (driving force F1) of motor 24 required by drive mechanism 20 in adjustment of the vehicle height is equal to the reaction force of coil spring 16 caused by the deformation thereof. Accordingly, in case the drive mechanism 20 is to be driven, it is not influenced by the sprung weight of the vehicle such that the output of motor 24 can be smaller.

Further, work W1 required for carrying out the vehicle height adjustment of 100 mm under the same condition as described above is the following value in case coil spring 16 is compressed to become shorter in length.

$$W1=1/2\times(19600-1960)\times 0.1^2=88.2 \text{ N/m} \quad (4)$$

In contrast to this, work W2 required for elevating the vehicle body by 100 mm at each road wheel by means of the conventional vehicle height adjusting apparatus is the following value.

$$W2=1500\times 9.8\times 0.1/4=367.5 \text{ N/m} \quad (5)$$

From the equations (4) and (5), the ratio of work W1 of the vehicle height adjusting apparatus of this embodiment to work W2 of the conventional apparatus is W1/W2=0.24, so that work W1 of the vehicle height adjusting apparatus of this embodiment can be smaller than that W2 of the conventional apparatus.

Further, since each drive mechanism 20 is disposed between vehicle body side member 12 and corresponding trailing arm 6 so as to be in parallel relation with the direction in which coil spring 16 deforms resiliently, the sprung weight is not loaded on each drive mechanism 20, thus enabling the members constituting drive mechanism 20 to be less in the strength as compared with those of the conventional screw drive mechanism.

Further, since drive mechanism 20 is disposed so as to be in parallel relation with the direction in which coil spring 16 deforms resiliently, arrangement of drive mechanism 20 does not cause any influence on the height of a vehicle floor above the ground and is therefore advantageous from the point of view of retaining the stroke of the suspension system.

Further, since drive mechanism 20 is simple in structure, it can be compact in size and can be attained at low cost.

Further, the spring constant of spiral spring 26 is set at a value smaller than that of coil spring 16 so that spiral spring 26 does not support the vehicle body resiliently. Thus, spiral spring 26 can follow elongation and contraction of wire 22 that is caused by the stroke of the suspension system without delay and can absorb slackness of wire 22 efficiently.

Figure 3:
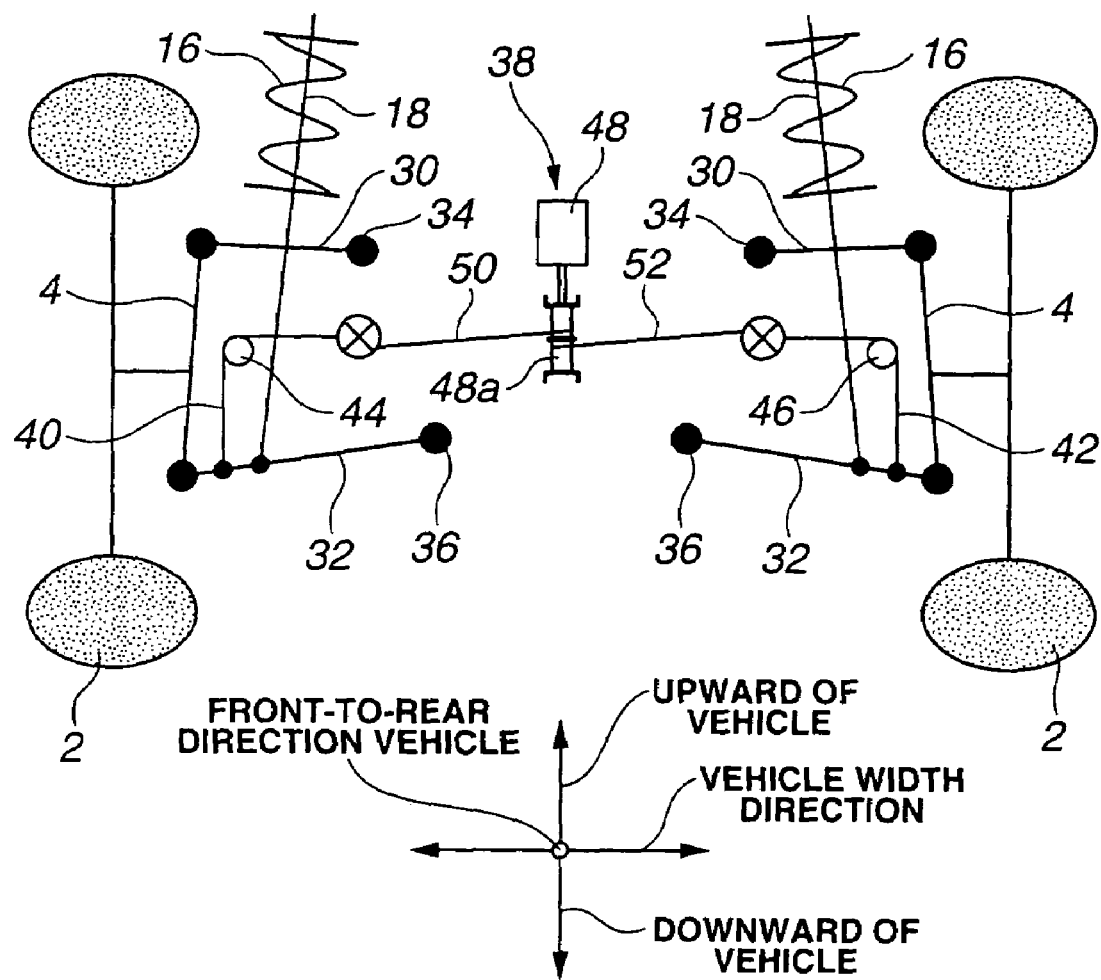
FIG. 3 is a diagrammatic view of double wishbone type suspension system having a vehicle height adjusting apparatus according to a second embodiment of the present invention.

Referring to FIG. 3, the vehicle height adjusting apparatus embodied in a double wishbone type suspension system according to a second embodiment of the present invention will be described. In this embodiment, like parts and portions to those of the first embodiment will be designated by like reference characters and will not be described in detail again.

In this suspension system, each carrier 4 that rotatably carries corresponding left or right road wheel 2 is supported by upper arm 30 and lower arm 32. The vehicle body side end portions of upper arm 30 and lower arm 32 are pivotally connected to vehicle body side member 12 by way of resilient bushings 34, 36, respectively.

Further, each shock absorber 18 is disposed so as to have a lower end pivotally connected to lower arm 32 and an upper end pivotally connected to vehicle body side member 12. Around each shock absorber 18 is disposed coil spring (suspension spring) 16. By this, the suspension system is adapted to support the vehicle weight (sprung weight).

In this embodiment, there is provided drive mechanism 38 for driving lower arms 32 upward and downward of the vehicle.

Drive mechanism 38 includes a pair of wires (line members) 40, 42 each connected at an end to each of lower arms 32 disposed at the laterally opposite sides of the vehicle, a pair of fixed pulleys 44, 46 supporting wires 40, 42 in a way as to allow wires 40, 42 to extend inboard or inward with respect to the vehicle width direction, reversible motor (power source) 48 installed on vehicle body side member 12 so as to be positioned at the widthwise center thereof, reel 48a fixedly attached to a rotation shaft of motor 48 and a pair of spiral springs (resilient members) 50, 52 wound in the same direction around reel 48a. Reversible motor 48 and reel 48*a* constitute a drive unit for driving wires 40, 42 inboard and outboard of a vehicle body.

Also, in this embodiment, the spring constant of spiral springs 50, 52 is set at a value smaller than that of coil spring 16 so as not to support the vehicle body.

In case the vehicle height is to be increased, motor 48 is driven in the normal direction so as to cause the pair of spiral springs 50, 52 to be wound around reel 48*a*. By this, coil springs 16 are resiliently deformed so as to become shorter in length and cause the vehicle body to move downward, thus decreasing the vehicle height.

Further, in case the vehicle height is to be lowered, motor 48 is driven to rotate in the direction opposite to the normal direction so as to unwind or pay out the pair of spiral springs 50, 52 having wound around reel 48*a*. By this, coil spring 16 is caused to increase in length, thus allowing the vehicle body to move upward and thereby increasing the vehicle height.

Accordingly, also in this embodiment, the output of motor 48 required at the time of adjustment of the vehicle height by means of drive mechanism 38 is only the reaction force that is caused by resilient deformation of coil spring 16. Accordingly, the driving of drive mechanism 38 is not influenced by the sprung weight, thus making it possible to decrease the necessary output of motor 48.

Further, although motor 48 is required to produce double the output as compared with motor 24 of drive mechanism 20 shown in FIGS. 1 and 2, adjustment of the vehicle height can be attained by one motor 48, thus making it possible to attain drive mechanism 38 that is more simplified.

Referring to FIGS. 4 to 7, the vehicle height adjusting apparatus embodied in another torsion beam type suspension system according to a third embodiment of the present invention will be described. In this embodiment, like parts and portions to those of the first embodiment described with reference to FIGS. 1 and 2 will be designated by like reference characters and will not be described in detail again.

Figure 4:
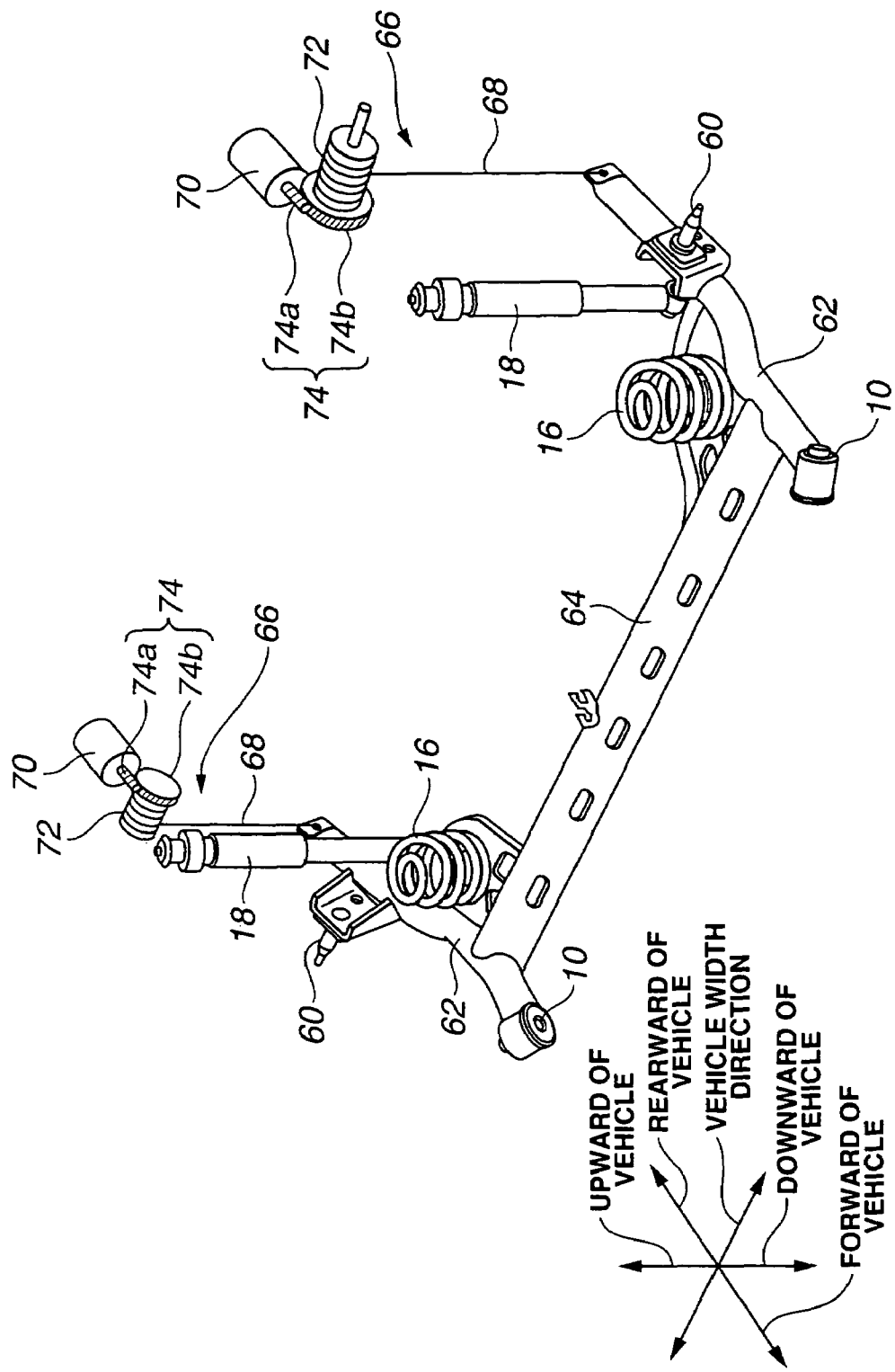
FIG. 4 is a perspective view of another torsion beam type suspension system having a vehicle height adjusting apparatus according to a third embodiment of the present invention.

The suspension system, as shown in FIG. 4, has a pair of carriers 60 rotatably carrying a pair of left and right road wheels 2, respectively and a pair of left and right trailing arms 62 elongating in the front-to-rear direction of a vehicle. Carriers 60 are secured to rear side portions of trailing arms 62 (i.e., portions located forward of the rear ends), respectively. Trailing arms (unsprung members) 62 are connected at portions forward of carriers 60 to torsion beam 64 elongating in the vehicle width direction so as to constitute an integral unit. Front end portions of trailing arms 62 are pivotally connected to vehicle body side member 12 (refer to FIG. 7) by way of resilient bushings 10, respectively.

Between the joint where each training arm 62 and each torsion beam 64 are joined and vehicle body side member 12 (refer to FIG. 7) is disposed coil spring 16 so that the suspension system supports thereon the vehicle weight. Further, shock absorbers 18 are disposed so as to be pivotally connected at lower ends thereof to left and right carriers 60 and at upper ends thereof to vehicle body side member 12, respectively.

Each drive mechanism 66 in this embodiment includes wire (line member) 68 having a lower end connected to a rear end portion of each trailing arm 62 that is located rearward of carrier 60, reversible motor 70 installed on vehicle body side member 12 so as to be positioned above the joint between trailing arm 62 and wire 68, reel 72 around which wire 68 is wound, and worm gearing 74 for transmitting rotation of motor 70 to reel 72. Reversible motor 70, reel 72 and worm gearing 74 constitute a drive unit for driving wire 68 toward and away from vehicle body side member 12.

Worm gearing 74 includes worm 74*a* coaxially fixed to a rotation shaft of motor 70 and worm wheel 74*b* meshed with worm 74*a* so as to be driven to rotate.

Figure 5:
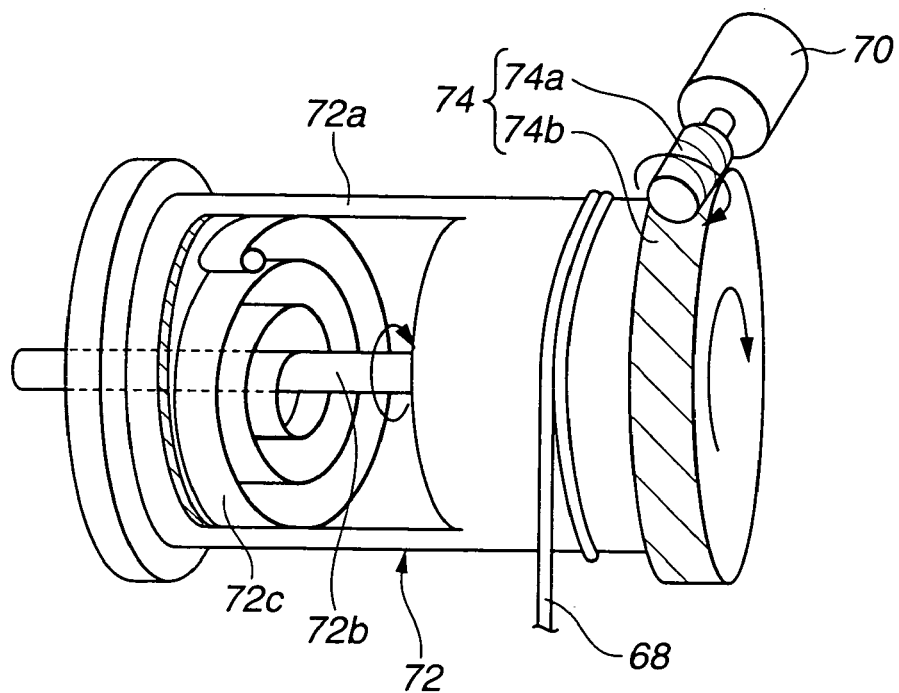
FIG. 5 is an enlarged perspective view of a drive mechanism of the vehicle height adjusting apparatus of FIG. 4.

Reel 72, as shown in FIG. 5, includes rotation shaft 72*b* rotatably supported at one end portion thereof on vehicle body side member 12, worm wheel 74*b* fixedly attached to the other end portion of rotation shaft 72*b*, hollow reel cylinder 72*a* rotatably installed on rotation shaft 72*b* and spiral spring (resilient member) 72*c* disposed inside reel cylinder 72*a* and fixedly attached at a radially inner end thereof to rotation shaft 72*b* and at a radially outer end thereof to reel cylinder 72*a*. In this connection, spiral spring 72*c* has a spring constant that is smaller than that of coil spring 16 so that, differing from coil spring 16, it does not support the vehicle body.

Figure 6:
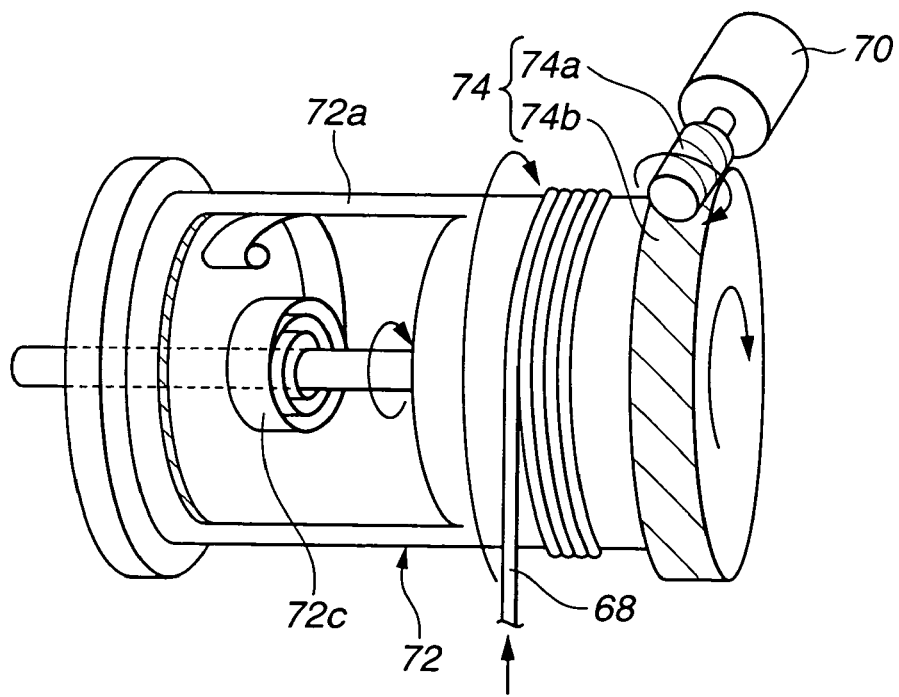
FIG. 6 is a view similar to FIG. 5 but shows a reel of the drive mechanism in a state of having wound more of a wire.

In case the vehicle height is to be lowered, worm 74*a* of worm gearing 74 is driven by motor 70 so as to rotate in the direction indicated by the arrow shown in FIG. 5. Rotation of worm 74*a* causes worm wheel 74*b* meshed with worm 74*a* to rotate in the direction indicated by the arrow in FIG. 5, thus causing spiral spring 72*c* to be resiliently deformed and wound around rotation shaft 72*b*. Then, as shown in FIG. 6, together with resilient deformation of spiral spring 72*c*, rotation of rotation shaft 72*b* is transmitted to reel cylinder 72*a* by way of spiral spring 72*c*. Reel cylinder 72*a* that rotates in the direction indicated by the arrow in FIG. 5 winds up and therefore pulls wire 68. By this, coil spring 16 is resiliently deformed so as to decrease in the length, thus causing the vehicle body to move downward.

Further, in case the vehicle height is to be increased, worm 74*a* of worm gearing 74 is driven by motor 70 so as to rotate by a predetermined number of turns in the direction opposite to that indicated by the arrow in FIG. 6. This rotation of worm 74*a* is transmitted by way of worm wheel 74*b* and spiral spring 72*c* to reel cylinder 72*a*, thus causing wire 68 having wound around reel cylinder 72*a* to be unwound or paid out. By this, coil spring 16 is resiliently deformed so as to increase in length, thus causing the vehicle body to move upward and therefore the vehicle height to increase.

Figure 7:
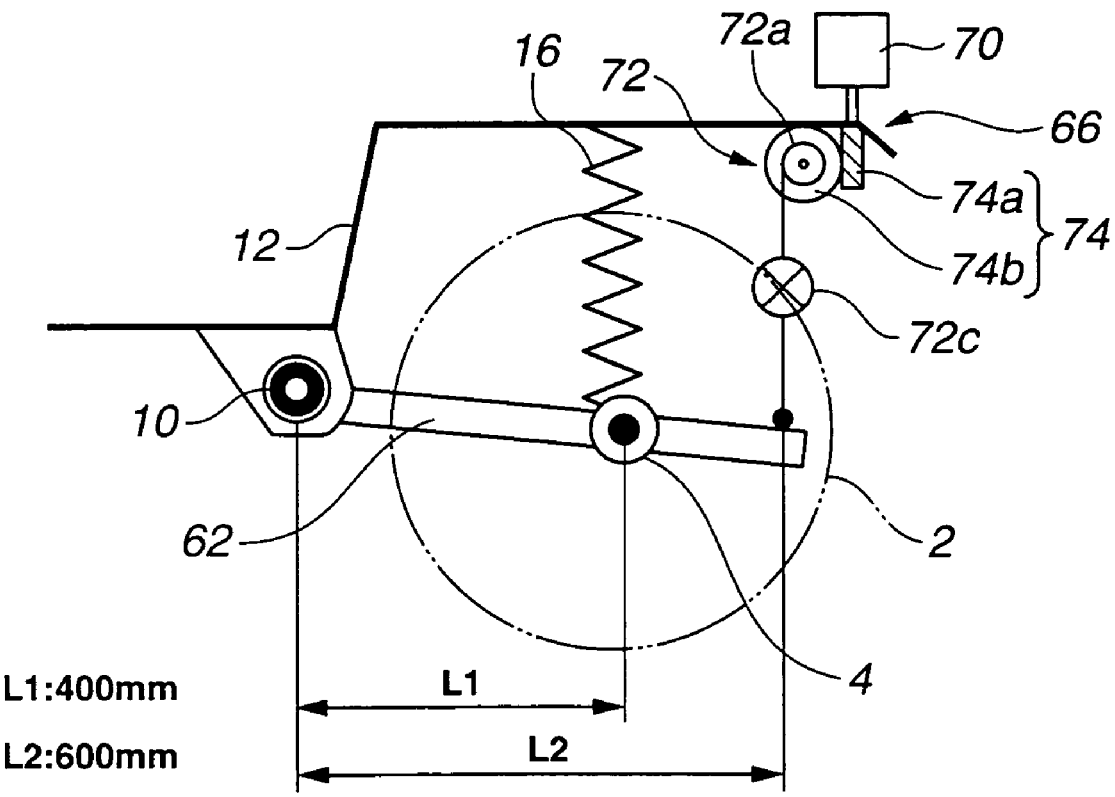
FIG. 7 is a diagrammatic view of the vehicle height adjusting apparatus of FIG. 4 when taken in the vehicle width direction.

FIG. 7 is a conceptual view of drive mechanism 66 that is disposed reward of coil spring 16 when taken in the vehicle width direction. In the conceptual view, spiral spring 72*c* is shown so as to be disposed outside of reel cylinder 72*a*.

Now, assuming that the distance L1 from the pivotal center of trailing arm 62 (i.e., the center of bushing 10) to the center of road wheel 2 is 400 mm, and the distance L2 from the pivotal center of trailing arm 62 to the joint where wire 68 of drive mechanism 66 is connected to the end portion of trailing arm 62 is 600 mm, adjustment of vehicle height by ±30 mm in case the vehicle weight (sprung weight) is 1500 Kg and the spring constant of coil spring 16 is 19.6 N/mm requires a driving force F3 of motor 70 that is calculated as follows if the spring constant of spiral spring 72*c* is 1.96 N/mm.

$$F3 = (19.6 - 1.96 \times 600/400) \times (30 \times 2) \times 400/600 = 666.4 \text{ N} \quad (7)$$

On the other hand, the required driving force F2 of the conventional vehicle height adjusting apparatus wherein the above-described screw drive mechanism supports the vehicle weight is 3675 N, i.e., F2=3675 N as is seen from the equation (3).

From the equations (7) and (3), the ratio of the driving force F3 of motor 70 in this embodiment to the driving force F2 of the conventional driving mechanism is F3/F2=0.18, thus enabling the driving force F3 of motor 70 in this embodiment can be smaller as compared with the driving force F2 in the conventional vehicle height adjusting apparatus.

Accordingly, in this embodiment, the output (driving force F3) of motor 70 that is required by drive mechanism 66 at the time of adjustment of the vehicle height is such a value that corresponds only to a reaction caused by resilient deformation of coil spring 16, so that the driving of drive mechanism 66 is not influenced by the sprung weight. Further, since worm gearing 74 is provided between motor 70 and reel 72, a driving force can be transmitted from motor 70 to reel 72 but a reaction of coil spring 16 is not transmitted as a rotational force to motor 70, thus making it possible to maintain a set vehicle height without requiring a particular lock mechanism.

Further, since the spring constant of spiral spring 72c is set smaller than that of coil spring and at such a small value that spiral spring 72c does not resiliently support the vehicle body. This enables spiral spring 72c to resiliently deform following movement of wire 68 that is caused by a stroke of the suspension system and absorb slackness of wire 68 with efficiency.

Further, when the torsion beam type suspension system of this embodiment is used as a rear suspension system, the height of the floor of the vehicle body above the ground can be decreased by utilizing the rearward space of the vehicle effectively since drive mechanism 66 is disposed rearward of the wheel center. Further, since spiral spring 72c is disposed inside cylinder 72a of reel 72, drive mechanism 66 can be small-sized, thus making it possible to attain disposition of trailing arm 62 in an upper space with ease.

The entire contents of Japanese Patent Applications P2003-039165 (filed Feb. 18, 2003) and P2003-413478 (filed Dec. 11, 2003) are incorporated herein by reference.

Although the invention has been described above by reference to certain embodiments of the invention, the invention is not limited to the embodiments described above. Modifications and variations of the embodiments described above will occur to those skilled in the art, in light of the above teachings. For example, while the embodiments have been described with respect to the case where drive mechanism 20, 38 or 66 is installed on vehicle body side member 12 and a free end of line member 22, 40, 42 or 68 is connected to unsprung member 6, 32, or 62, drive mechanism 20, 38 or 66 may be installed on unsprung member 6, 32 or 62 and the free end of line member 22, 40, 42 or 68 may be connected to vehicle body side member. The scope of the invention is defined with reference to the following claims.

What is claimed is:

1. A vehicle height adjusting apparatus comprising:
a suspension spring supporting a sprung weight of a vehicle;
a pivotal unsprung member carrying a road wheel and connected to a lower end of the suspension spring so as to pivot in response to deformation of the suspension spring; and
a drive mechanism adapted so as to be free from the sprung weight and capable of moving the unsprung member so as to cause the suspension spring to increase or decrease in length and thereby adjusting a vehicle height at the road wheel,
wherein the drive mechanism includes a line member connected at one end thereof to one of a vehicle body side member and the unsprung member, a drive unit disposed at the other of the vehicle body side member and the unsprung member and capable of driving the line member toward and away from the other of the vehicle body side member and the unsprung member, and a resilient member connected to the other end of the line member, the drive unit being capable of driving the line member by way of the resilient member, and
wherein the drive unit comprises a reel, and the resilient member includes a spiral spring connected to the other end of the line member and wound around the reel, the drive unit being capable of varying an amount by which the spiral spring is wound around the reel.

2. A vehicle height adjusting apparatus according to claim 1, wherein the drive mechanism is disposed between a vehicle body side member and the unsprung member so as to be in parallel relation with the direction in which the suspension spring deforms resiliently.

3. A vehicle height adjusting apparatus according to claim 1, wherein the drive mechanism is disposed rearward of the suspension spring.

4. A vehicle height adjusting apparatus according to claim 1, wherein the spiral spring is smaller in spring constant than the suspension spring.

5. A vehicle height adjusting apparatus comprising:
a suspension spring supporting a sprung weight of a vehicle;
a pivotal unsprung member carrying a road wheel and connected to a lower end of the suspension spring so as to pivot in response to deformation of the suspension spring; and
a drive mechanism adapted so as to be free from the sprung weight and capable of moving the unsprung member so as to cause the suspension spring to increase or decrease in length and thereby adjusting a vehicle height at the road wheel,
wherein the drive mechanism includes a line member connected at one end thereof to one of a vehicle body side member and the unsprung member and a drive unit disposed at the other of the vehicle body side member and the unsprung member and capable of driving the line member toward and away from the other of the vehicle body side member and the unsprung member,
wherein the drive unit includes a reel connected to the other end of the line member and rotatable to wind up the line member, a drive source for driving the reel and a worm gearing for transmitting power from the drive source to the reel, the worm gearing including a worm connected to the drive source and a worm wheel attached to the reel so as to be rotatable together with the reel in response to rotation of the worm, and
wherein the reel includes a rotation shaft rotatably mounted at one end portion thereof on the vehicle body side member and connected at the other end portion thereof to the worm wheel so as to rotate together therewith, a hollow reel cylinder rotatably mounted on the rotation shaft and a resilient member disposed inside the reel cylinder and having opposite ends connected to the rotation shaft and the reel cylinder, respectively.

6. A vehicle height adjusting apparatus according to claim 5, wherein the resilient member comprises a spiral spring having a radially inner end connected to an outer circumferential surface of the rotation shaft and a radially outer end connected to an inner circumferential surface of the reel cylinder.

7. A vehicle height adjusting apparatus according to claim 6, wherein the spiral spring is smaller in spring constant than the suspension spring.

8. A vehicle height adjusting apparatus according to claim 5, wherein the drive mechanism is disposed between a vehicle body side member and the unsprung member so as to be in parallel relation with the direction in which the suspension spring deforms resiliently.

9. A vehicle height adjusting apparatus according to claim 5, wherein the drive mechanism is disposed rearward of the suspension spring.

10. A vehicle suspension system comprising:
a suspension member pivotally connected at an end portion thereof to a vehicle body side member and rotatably supporting a road wheel;
a suspension spring disposed between the vehicle body side member and the suspension member;
a line member connected at one end thereof to the suspension member; and
a drive unit installed on the vehicle body side member and connected to the other end of the line member, the drive unit being capable of driving the line member toward and away from the vehicle body side member and thereby adjusting a vehicle height at the road wheel,
wherein the drive unit includes a reel connected to the other end of the line member, a reversible motor drivingly connected to the reel, and a spiral spring wound around the reel, the other end of the line member being connected to the reel by way of the spiral spring.

11. A vehicle suspension system according to claim 10, wherein the suspension member is elongated in a front-to-rear direction of a vehicle so that said end portion is a front end portion.

12. A vehicle suspension system according to claim 11, wherein the suspension member rotatably supports the road wheel at a rear end portion thereof, the line member being connected to the rear end portion of the suspension member.

13. A vehicle suspension system according to claim 11, wherein the suspension member rotatably supports the road wheel at a rear side portion located forward of a rear end, the line member being connected to the rear end of the suspension member.

14. A vehicle suspension system according to claim 10, wherein the suspension member is elongated in a vehicle width direction so that said end portion is an inboard end portion.

15. A vehicle suspension system according to claim 14, wherein the suspension member rotatably supports the road wheel at an outboard end portion thereof, the line member being connected to the outboard end portion of the suspension member.

16. A vehicle suspension system according to claim 10, wherein the spiral spring is smaller in spring constant than the suspension spring.

17. A vehicle suspension system comprising:
a suspension member pivotally connected at an end portion thereof to a vehicle body side member and rotatably supporting a road wheel;
a suspension spring disposed between the vehicle body side member and the suspension member;
a line member connected at one end thereof to the suspension member; and
a drive unit installed on the vehicle body side member and connected to the other end of the line member, the drive unit being capable of driving the line member toward and away from the vehicle body side member and thereby adjusting a vehicle height at the road wheel,
wherein the drive unit includes a reel connected to the other end of the line member and a reversible motor drivingly connected to the reel, and
wherein the reel includes a hollow reel cylinder, a rotation shaft rotatably mounted on the vehicle body side member and rotatably supporting thereon the reel cylinder and a spiral spring disposed inside the reel cylinder so as to wind around the rotation shaft and having opposite ends connected to the reel cylinder and the rotation shaft, respectively, the drive unit further including a worm gearing transmitting power from the motor to the rotation shaft.

18. A vehicle suspension system according to claim 17, wherein the worm gearing comprises a worm wheel connected to the rotation shaft to rotate together therewith and a worm meshed with the worm wheel and connected to the motor so as to be driven thereby.

19. A vehicle suspension system according to claim 17, wherein the suspension member is elongated in a front-to-rear direction of a vehicle so that said end portion is a front end portion.

20. A vehicle suspension system according to claim 19, wherein the suspension member rotatably supports the road wheel at a rear end portion thereof, the line member being connected to the rear end portion of the suspension member.

21. A vehicle suspension system according to claim 19, wherein the suspension member rotatably supports the road wheel at a rear side portion located forward of a rear end, the line member being connected to the rear end of the suspension member.

22. A vehicle suspension system according to claim 17, wherein the suspension member is elongated in a vehicle width direction so that said end portion is an inboard end portion.

23. A vehicle suspension system according to claim 22, wherein the suspension member rotatably supports the road wheel at an outboard end portion thereof, the line member being connected to the outboard end portion of the suspension member.

24. A vehicle height adjusting apparatus comprising:
a suspension spring supporting a sprung weight of a vehicle;
a pivotal unsprung member carrying a road wheel and connected to a lower end of the suspension spring so as to pivot in response to deformation of the suspension spring; and
a drive mechanism adapted so as to be free from the sprung weight and capable of moving the unsprung member so as to cause the suspension spring to increase or decrease in length and thereby adjusting a vehicle height at the road wheel,
wherein the drive mechanism includes a line member connected at one end thereof to one of a vehicle body side member and the unsprung member and a drive unit disposed at the other of the vehicle body side member and the unsprung member and capable of driving the line member toward and away from the other of the vehicle body side member and the unsprung member, and
wherein the drive mechanism further includes a resilient member connected to the other end of the line member, the drive unit causing the resilient member to deform resiliently, thereby driving the line member.

* * * * *